United States Patent [19]
Galli

[11] Patent Number: 6,089,340
[45] Date of Patent: Jul. 18, 2000

[54] OFF-ROAD VEHICLE WITH A STEERABLE FRONT AXLE AND A FRONT POWER TAKEOFF COUPLING

[75] Inventor: Maurizio Galli, Carpi, Italy

[73] Assignee: New Holland North America, Inc., New Holland, Pa.

[21] Appl. No.: 09/092,439

[22] Filed: Jun. 5, 1998

[30] Foreign Application Priority Data

Jun. 6, 1997 [IT] Italy .................................. TO97A0496

[51] Int. Cl.[7] .................................................. B60K 25/02
[52] U.S. Cl. ........................................ 180/53.1; 180/53.7
[58] Field of Search ................... 180/53.1, 53.7

[56] References Cited

U.S. PATENT DOCUMENTS

| | | | |
|---|---|---|---|
| 3,759,340 | 9/1973 | Schilter | 180/53.7 |
| 4,650,018 | 3/1987 | Silverman, Sr. | 180/53.7 |
| 5,476,150 | 12/1995 | Hurlburt et al. | 180/53.7 |

*Primary Examiner*—Kenneth R. Rice
*Attorney, Agent, or Firm*—Larry W. Miller; J. William Stader; Frank A. Seemar

[57] ABSTRACT

An off-road vehicle is disclosed having a steerable front axle and a front power take-off (PTO) drive coupling mounted for movement with the steerable front axle and connected by a transmission train to a PTO drive shaft projecting from the vehicle engine, the PTO drive coupling and the engine PTO drive shaft being vertically offset from one another. The transmission train comprises a gearbox fixedly mounted in relation to the vehicle engine and having vertically offset input and output shafts, means connecting the input shaft of the gearbox to the engine PTO drive shaft, and a telescopically extendible propeller shaft connected by way of respective universal joints to the output shaft of the gearbox and the PTO drive coupling.

6 Claims, 2 Drawing Sheets

OFF-ROAD VEHICLE WITH A STEERABLE FRONT AXLE AND A FRONT POWER TAKEOFF COUPLING

BACKGROUND OF THE INVENTION

The present invention relates to an off-road vehicle, such as a tractor, having a front axle with compound steering and a power takeoff drive coupling mounted for movement with the steerable axle, wherein the engine has a power takeoff shaft connected to the drive coupling by a transmission train, the axis of the engine power takeoff shaft being vertically offset from the axis of the drive coupling.

U.S. Pat. No. 4,825,970 describes an adaptation of a conventional road vehicle, such as a car, van or a truck to allow the engine to drive a power takeoff (PTO) coupling. A propeller shaft leading to the PTO drive coupling extends to a point below the crankshaft pulley and is driven by means of a chain that passes over a sprocket mounted on the crankshaft and a sprocket mounted on the propeller shaft. In this patent specification, the PTO coupling cannot move significantly in relation to the engine and it is not even necessary to provide universal joints in the propeller shaft. The transmission train connecting the engine to the PTO drive coupling in this patent is therefore totally unsuitable for a vehicle in which the PTO drive coupling is mounted for movement with a steerable axle, as present in some tractors or other off-road vehicles fitted with a compound steering system.

Compound steering is used in off-road vehicles to reduce the turning circle. In addition to the wheels pivoting about a vertical axis relative to the front axle, the axle as a whole pivots about a vertical axis relative to the vehicle centreline. The pivot axis of the axle is often set back from the axis of rotation of the wheels so that the axle swings from side to side at the same time as pivoting. This allows the steerable wheels to be turned to a greater extent without colliding with the engine or chassis of the tractor.

A front PTO drive coupling that is mounted for movement with the steerable axle of an off-road vehicle having compound steering is known from EP-A-0.691.255. Here, the PTO drive coupling is arranged below and forwardly of a PTO drive shaft that projects from the front end of the engine. The PTO drive coupling is connected to the engine PTO drive shaft by a transmission train that consists of an inclined telescopically extendible propeller shaft having universal joints at both ends.

A problem with this known design is that torque is never transmitted in a straight line from the engine power takeoff shaft to the drive coupling. Even when the vehicle is being driven forwards in a straight line, the drive coupling and the engine power takeoff shaft do not lie in line with one another. Instead, the propeller shaft is inclined in a vertical plane relative to the engine power takeoff shaft and the power takeoff drive coupling and power is transmitted at an angle through the universal joints at all times. When the vehicle is steered, the angle through which torque needs to be transmitted is increased still further. The maximum angle through which the universal joints of the connecting shaft must be capable of transmitting torque is therefore even greater than the steering angle of the axle and this large angle places great demands on the universal joints, adding to their expense and increasing the wear to which they are subjected.

The present invention therefore seeks to provide a vehicle having a PTO drive coupling mounted on a steerable axle in which the foregoing disadvantages are mitigated.

SUMMARY OF THE INVENTION

According to the present invention, there is provided an off-road vehicle having a steerable front axle and a front power take-off (PTO) drive coupling mounted for movement with the steerable front axle and connected by a transmission train to a PTO drive shaft projecting from the vehicle engine, the PTO drive coupling and the engine PTO drive shaft being vertically offset from one another, wherein the transmission train comprises a gearbox fixedly mounted in relation to the vehicle engine and having vertically offset input and output shafts, means connecting the input shaft of the gearbox to the engine PTO drive shaft, and a telescopically extendible propeller shaft connected by way of respective universal joints to the output shaft of the gearbox and the PTO drive coupling.

In the invention, a gearbox is used to introduce a step into the transmission train so that the propeller shaft should lie more nearly in a straight line with the axis of the gearbox output shaft and the axis of the PTO drive coupling so as to reduce the compound maximum angle through which torque needs to be transmitted to the PTO drive coupling when the vehicle is driven with a full steering lock.

The gearbox may have any desired transmission ratio, including a ratio of 1:1, but it is preferred that the gearbox should be a step down gearbox, with the output shaft rotating more slowly than the input shaft. Conveniently, the ratio of the gearbox may be 2.3:1.

Advantageously, the transmission train also includes a disengageable friction clutch to control the transmission of torque to the drive coupling.

For space consideration, the clutch may conveniently be incorporated in the power takeoff drive coupling mounted for movement with the steerable axle but in principle it may be located at any desired point along the transmission train.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
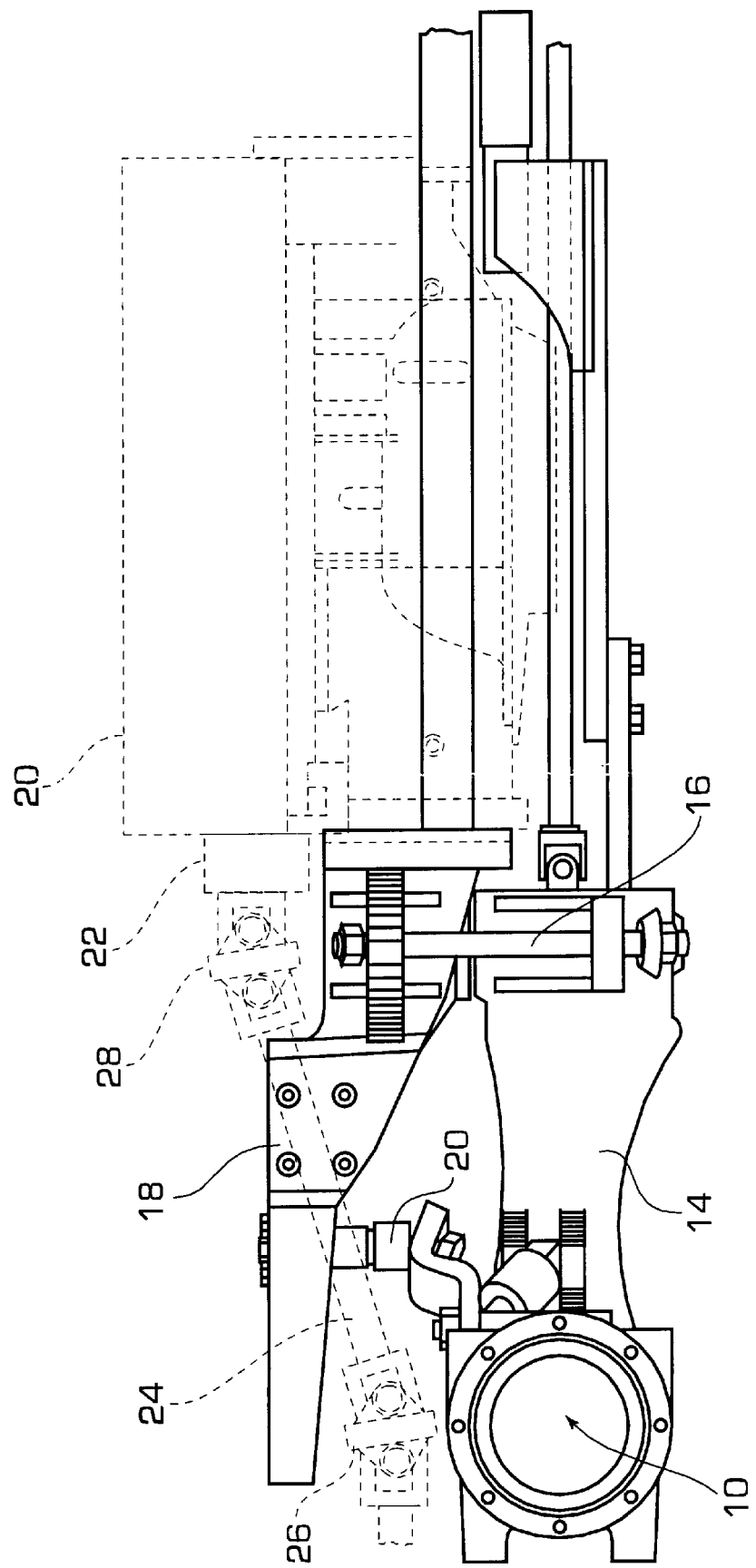
FIG. 1 is a schematic longitudinal section through a known tractor having a front axle with compound steering and a PTO drive coupling mounted for movement with the front axle.

FIG. 1 shows part of a tractor having a compound steering as described in EP-A-0.691.255. The tractor has a front axle generally designated 10 which is generally T-shaped when viewed in plan. The wheels are mounted at the ends of the cross bar of the "T", while end of the upright 14 of the "T" is pivotable about the axis of a vertical pin 16 relative to the chassis 18. A steering linkage connected to the axle 10, the chassis 18 and the wheels 12 synchronises the steering movements of the wheels 12 relative to the axle 10 with the pivoting of the axle 10 relative to the chassis.

Because the axis 16 is set back from the wheel centres, the wheels 12 are moved laterally relative to the chassis 18 during steering movements and this enables the wheels to be turned through a larger steering angle without colliding with the chassis or the engine. As the design of a compound steering system in a tractor is generally known, it is no believed necessary to describe the compound steering system in greater detail and it suffices for the present invention to understand that the axle 10 rotates from side to side about the axis of the pin 16 when the tractor is steered.

Consequently, if a front PTO coupling is mounted on the axle 10 then it too will move relative to the vehicle chassis and in particular relative to the front PTO shaft on the engine.

FIG. 1 shows in dotted lines the position of the engine 20 and the front PTO shaft 22. The transmission that connects the front PTO shaft 22 of the engine 20 to the front PTO coupling, which is mounted on the axle 10 but not shown in the drawing, comprises an inclined telescopic propeller shaft 24 having universal joints 26 and 28 at its opposite ends. At all times, even when the tractor is being driven in a straight line, torque is transmitted at an angle in the vertical plane through the universal joints 26 and 28. When the axle 10 pivots about the pin 16, the angle through which torque is transmitted is increased and the maximum angle through which universal joints 26 and 28 must be capable of transmitting torque is greater than the maximum angle through which the axle 10 can rotate in the horizontal plane. As a result, great demands are placed on the universal joints 26 and 28, adding to their cost and reducing their reliability.

Figure 2:
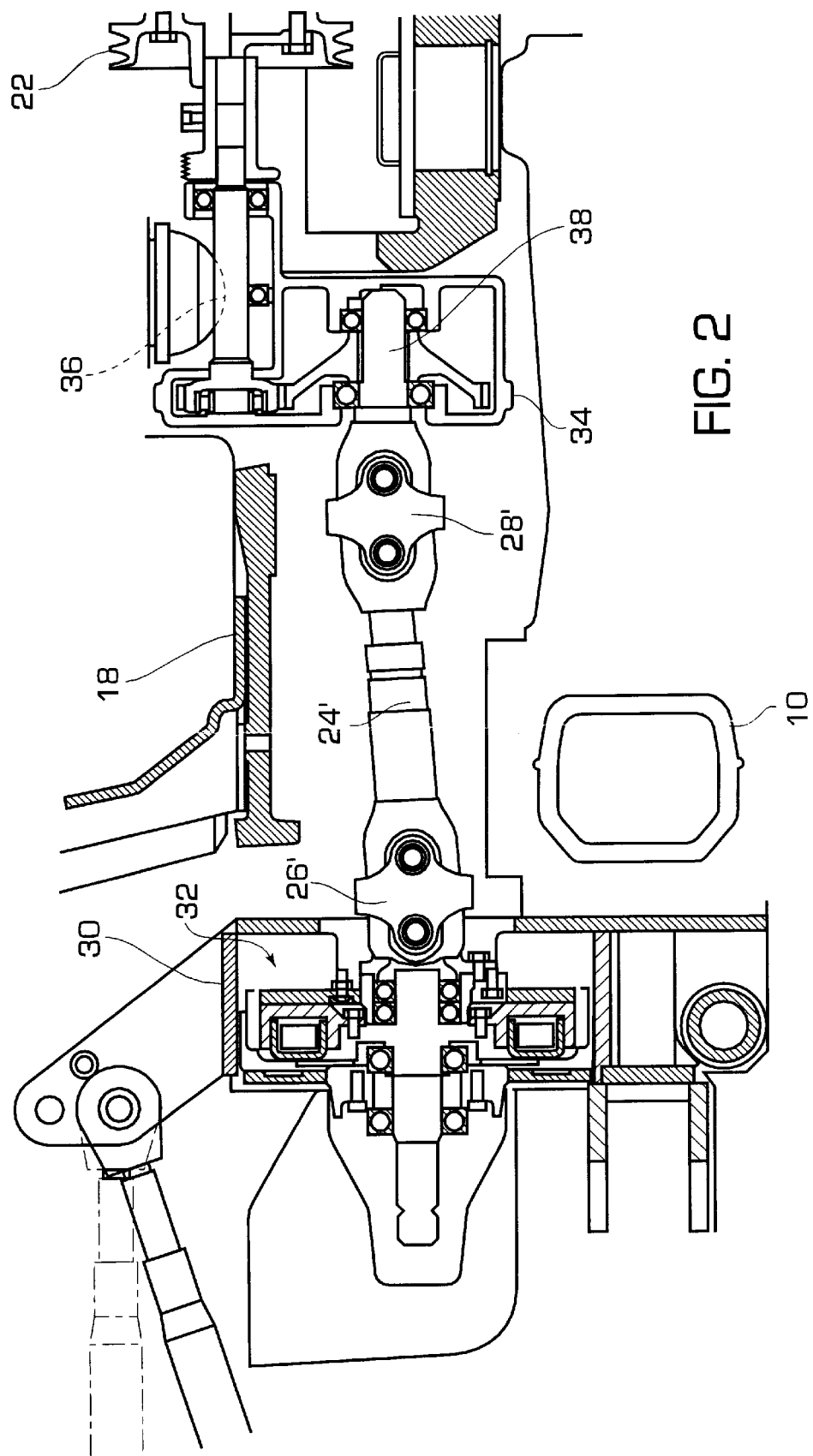
FIG. 2 is a schematic longitudinal partial section through a tractor embodying the present invention.

The embodiment of the invention shown in FIG. 2 reduces the demands placed on the universal joints of the propeller shaft transmitting torque from the front PTO shaft of the engine to the front PTO coupling movable with the front axle. In FIG. 2, details of the construction of the tractor, the front axle and steering system have been omitted in the interest of clarity, but it may be assumed that, as previously described, the tractor has a steerable axle 10, a chassis 18 and an engine with a front PTO shift 22.

The front PTO coupling is designated 30 in FIG. 2 and incorporates an electromagnetically actuated friction clutch 32 that allows torque to the driven implement to be selectively engaged and disengaged. A propeller shaft 24' with universal joints 26' and 28' transmits torque from the front PTO shaft 22 of the engine to the front PTO coupling 30. However, instead of being directly connected to the engine PTO shaft 22, the propeller shaft 24' is connected to a gearbox 34 that passes through a hole in the chassis of the tractor.

The gearbox has parallel input 36 and output shafts 38 that are vertically offset from one another. Within the gearbox, the input and output shafts are each coupled for rotation with a respective one of two gearwheels that are in permanent mesh with one another so that the input shaft 36 always rotates in a fixed speed ratio to the output shaft 38. The input shaft 36 of the gearbox is coupled for rotation with the engine front PTO shaft 22 while the output shaft 38 is connected to the universal joint 28'.

The gearwheels within the gearbox 34 are sized so that the separation of the axes of the input and output shafts 36 and 38 corresponds at least approximately to the vertical offset between the engine PTO shaft 22 and the front PTO drive coupling 32. Consequently, he propeller shaft 24' is more nearly horizontal and transmits torque at least approximately in a straight line through universal joints 26' and 28' when the vehicle is not being steered. When the vehicle is driven with a full steering lock, torque is transmitted at an angle through the universal joints 26' and 28' but the maximum angle is less than the angle in the prior art construction of FIG. 1, as it is not compounded with an angle caused by the presence of a vertical offset.

The gearwheels in the gearbox can be in any desired ratio to one another but it is preferred that the input shaft 36 should rotate 2.3 times as fast as the output shaft 38.

It will be appreciated that various modifications may be made to the described preferred embodiment of the invention without departing from the scope of the invention as set out in the appended claims. In particular, while an electromagnetically actuated clutch is preferred, it is possible to provide a manually releasable coupling between the engine PTO shaft 22 and the input shaft 36 of the gearbox 34 or a synchromesh selector may be included within the gearbox.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. An off-road vehicle having a steerable front axle and a front power take-off (PTO) drive coupling mounted for movement with the steerable front axle and connected by a transmission train to a PTO drive shaft projecting from the vehicle engines the PTO drive coupling and the engine PTO drive shaft being vertically offset from one another, wherein the transmission train comprises a gearbox fixedly mounted in relation to the vehicle engine and having vertically offset input and output shafts, means connecting the input shaft of the gearbox to the engine PTO drive shaft and a telescopically extendible propeller shaft connected by way of respective universal joints to the output shaft of the gearbox and the PTO drive coupling, wherein the gearbox output shaft is substantially level with the front PTO drive coupling.

2. The off-road vehicle as claimed in claim 1, wherein a manually releasable coupling is provided between the gearbox input shaft and the engine PTO drive shaft.

3. The off-road vehicle as claimed in claim 2, wherein the front PTO drive coupling includes a housing mounted on the front axle of the vehicle and incorporating a remotely controllable clutch.

4. The off-road vehicle as claimed in claim 3, wherein the clutch is an electromagnetically actuated clutch.

5. The off-road vehicle as claimed in claim 4, wherein the gearbox is a change speed gearbox, the output shaft rotating in use more slowly than the input shaft.

6. The off-road vehicle as claimed in claim 5, wherein the gearbox passes through a hole in the vehicle chassis.

* * * * *